(12) United States Patent
Chaturvedi et al.

(10) Patent No.: US 9,874,961 B2
(45) Date of Patent: Jan. 23, 2018

(54) OPTICAL STRUCTURES HAVING INTEGRATED COMPONENT LAYERS (71) Applicant: Corning Incorporated, Corning, NY (US)

(72) Inventors: Ashish Hersh Chaturvedi, Painted Post, NY (US); Tomohiro Ishikawa, Corning, NY (US); Lili Tian, Laurel, MD (US)

(73) Assignee: Corning Incorporated, Corning, NY (US)

( * ) Notice: Subject to any disclaimer, the term of this patent is extended or adjusted under 35 U.S.C. 154(b) by 80 days.

(21) Appl. No.: 14/897,035

(22) PCT Filed: Jun. 2, 2014

(86) PCT No.: PCT/US2014/040499
§ 371 (c)(1),
(2) Date: Dec. 9, 2015

(87) PCT Pub. No.: WO2014/200750
PCT Pub. Date: Dec. 18, 2014

(65) Prior Publication Data
US 2016/0154508 A1 Jun. 2, 2016

Related U.S. Application Data (60) Provisional application No. 61/833,168, filed on Jun. 10, 2013.

(51) Int. Cl.
*G06F 3/041* (2006.01)
*C03C 17/00* (2006.01)
(Continued)

(52) U.S. Cl.
CPC .......... *G06F 3/0412* (2013.01); *C03C 17/002* (2013.01); *C03C 17/38* (2013.01);
(Continued)

(58) Field of Classification Search
None
See application file for complete search history.

(56) References Cited

U.S. PATENT DOCUMENTS 3,338,696 A    8/1967   Dockerty
3,682,609 A    8/1972   Dockerty
(Continued)

FOREIGN PATENT DOCUMENTS

JP    2009037765 A    2/2009
JP    2011081810 A    4/2011
(Continued)

OTHER PUBLICATIONS

Plichta, et al., "Ultra Thin Flexible Glass Substrates", Materials Research Society, vol. 769, 2003, pp. H9.1.1-H9.1.10.
(Continued)

*Primary Examiner* — Kenneth B Lee, Jr.
(74) *Attorney, Agent, or Firm* — Jeffrey A. Schmidt (57) ABSTRACT A method of forming an optical structure in a continuous manufacturing process includes providing a continuous ribbon of flexible glass substrate (134) having a thickness of no more than 0.3 mm. The continuous ribbon of flexible glass substrate has a first side and a second side separated by a plane formed by the ribbon of flexible glass substrate. A liquid polarizer material (142) is applied on the ribbon of flexible glass substrate at one of the first and second sides as the continuous ribbon of flexible glass substrate moves by a polarizer material application apparatus to form a polarizing layer. A conductive material (150) is applied on the ribbon of flexible glass substrate at one of the first and second sides to form a touch layer for a touch sensitive display.

15 Claims, 4 Drawing Sheets (51) Int. Cl.
    *C03C 17/38* (2006.01)
    *C03C 17/42* (2006.01)
    *G02B 1/08* (2006.01)
    *G02B 5/30* (2006.01)
    *G02F 1/1333* (2006.01)

(52) U.S. Cl.
    CPC .............. *C03C 17/42* (2013.01); *G02B 1/08* (2013.01); *G02B 5/3083* (2013.01); *G06F 3/041* (2013.01); *G02F 1/13338* (2013.01); *G06F 2203/04102* (2013.01); *G06F 2203/04103* (2013.01)

(56) References Cited

U.S. PATENT DOCUMENTS

| | | |
|---|---|---|
| 6,049,428 A | 4/2000 | Khan et al. |
| 6,570,632 B2 | 5/2003 | Lavrentovich et al. |
| 6,765,629 B1 | 7/2004 | Jeong et al. |
| 7,271,864 B2 | 9/2007 | Yoon |
| 7,372,524 B2 | 5/2008 | Hong |
| 7,940,342 B2 | 5/2011 | Lee |
| 8,228,306 B2 | 7/2012 | Long et al. |
| 2004/0027339 A1 | 2/2004 | Schulz |
| 2005/0001955 A1 | 1/2005 | Yoon |
| 2005/0014039 A1 | 1/2005 | Rolf |
| 2005/0037184 A1* | 2/2005 | Halsey, IV ........ B32B 17/10018 428/210 |
| 2008/0197518 A1* | 8/2008 | Aylward ............. G02B 5/3083 264/1.34 |
| 2011/0081542 A1 | 4/2011 | Pilloy et al. |
| 2011/0298756 A1 | 12/2011 | Kim et al. |
| 2012/0034435 A1 | 2/2012 | Borrelli et al. |

FOREIGN PATENT DOCUMENTS

| | | |
|---|---|---|
| KR | 2005087906 A | 9/2005 |
| KR | 2006127325 A | 12/2006 |
| KR | 2009017739 A | 2/2009 |
| KR | 2012110885 A | 10/2012 |

OTHER PUBLICATIONS

Tian, et al., "High-Temperature, Roll-to-Roll Process on Flexible Glass", 2013FLEX Conference and Exhibition, Jan. 29-Feb. 1 Presentation.

Tam-Chang, et al., "Chromonic liquid crystals: properties and applications as functional materials", Chemical Communications, 2008, pp. 1957-1967.

Schneider, et al., "Self-Assembled Monolayers and Multilayered Stacks of Lyotropic Chromonic Liquid Crystalline Dyes with In-Plane Orientational Order", Langmuir, 2000, vol. 16, pp. 5227-5230.

* cited by examiner

OPTICAL STRUCTURES HAVING INTEGRATED COMPONENT LAYERS

CROSS-REFERENCE TO RELATED APPLICATIONS

This application claims the benefit of priority under 35 U.S.C. § 371 of International Patent Application Serial No. PCT/US14/40499, filed on Jun. 2, 2014, which in turn, claims the benefit of priority of U.S. Provisional Patent Application Serial No. 61/833168, filed on Jun. 10, 2013, the contents of each of which are relied upon and incorporated herein by reference in their entireties.

FIELD

The present disclosure relates to optical structures and, more particularly, to flexible glass substrates having integrated component layers.

BACKGROUND

Touch function has been increasingly integrated into mobile devices using touch displays. The touch displays are typically built using multiple films and/or physically distinct devices. For example, a touch-sensitive device may be attached to a display device. A control device may receive input from the touch-sensitive device to determine a location of any touching of the touch-sensitive device and can provide output that can be used to display information using the display device to a user. What is desired is an integrated optical structure having both touch and polarizing components integrated on a flexible glass substrate.

SUMMARY

One technique to improve touch function in optical structures is to incorporate one or both of the touch and polarizing components on a flexible glass substrate where at least the polarizing component is created using a coating. This can facilitate continuous processing of a flexible glass ribbon, for example, in a roll-to-roll process.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting example the various features of the disclosure may be combined with one another according to the following aspects.

According to a first aspect, a method of forming an optical structure in a continuous manufacturing process comprises:

providing a continuous ribbon of flexible glass substrate having a thickness of no more than 0.3 mm, the continuous ribbon of flexible glass substrate having a first side and a second side separated by a plane formed by the ribbon of flexible glass substrate;

applying a liquid polarizer material on the ribbon of flexible glass substrate at one of the first and second sides as the continuous ribbon of flexible glass substrate moves by a polarizer material application apparatus to form a polarizing layer; and applying a conductive material on the ribbon of flexible glass substrate at one of the first and second sides to form a touch layer for a touch sensitive display.

According to a second aspect, there is provided the method of aspect 1, wherein the liquid polarizer material comprises a dichroic dye-containing liquid.

According to a third aspect, there is provided the method of aspect 1 or aspect 2, wherein the conductive material comprises indium tin oxide or silver nano-wire.

According to a fourth aspect, there is provided the method of any one of aspects 1-3, wherein the conductive material is transparent.

According to a fifth aspect, there is provided the method of any one of aspects 1-4, further comprising orienting the liquid polarizing material to form a polarizing component.

According to a sixth aspect, there is provided the method of any one of aspects 1-5, further comprising applying a retardation material at one of the first and second sides.

According to a seventh aspect, there is provided the method of aspect 6, wherein the retardation material forms a retardation layer located between the polarizing layer and the ribbon of flexible glass substrate at the first side of the ribbon of flexible glass substrate.

According to an eighth aspect, there is provided the method of aspect 7, wherein the touch layer is located at the second side of the ribbon of flexible glass substrate.

According to a ninth aspect, there is provided the method of aspect 6, wherein the retardation material forms a retardation layer, the polarizing layer located between the ribbon of flexible glass substrate and the polarizing layer.

According to a tenth aspect, there is provided the method of any one of aspects 1-9, wherein the polarizing layer is located at the first side of the ribbon of flexible glass substrate and the touch layer is located at the second side of the ribbon of flexible glass substrate.

According to an eleventh aspect, there is provided the method of any one of aspects 1-6, wherein both the polarizing layer and the touch layer are located at the first side of the ribbon of flexible glass substrate.

According to a twelfth aspect, there is provided the method of aspect 11, wherein the touch layer is located between the ribbon of flexible glass substrate and the polarizing layer.

According to a thirteenth aspect, there is provided the method of aspect 12, further comprising applying a retardation layer at the first side of the ribbon of flexible glass substrate, wherein the touch layer and the polarizing layer are located between the retardation layer and the ribbon of flexible glass substrate.

According to a fourteenth aspect, there is provided the method of aspect 11, wherein the polarizing layer is located between the touch layer and the ribbon of flexible glass substrate.

According to a fifteenth aspect, an optical structure comprises:

a flexible glass substrate having a thickness of no more than 0.3 mm, the flexible glass substrate having a first side and a second side separated by a plane formed by the flexible glass substrate;

a coating of a polarizer material on the flexible glass substrate at one of the first and second sides forming a polarizing layer, the coating of polarizer material being formed of a dichroic dye-containing liquid; and a conductive material on the flexible glass substrate at one of the first and second sides to form a touch layer for a touch sensitive display.

According to a sixteenth aspect, there is provided the optical structure of aspect 15, wherein the conductive material comprises indium tin oxide or silver nano-wire.

According to a seventeenth aspect, there is provided the optical structure of aspect 15 or aspect 16, wherein the conductive material is transparent.

According to an eighteenth aspect, there is provided the optical structure of any one of aspects 15-17, further comprising a retardation material at one of the first and second sides.

According to a nineteenth aspect, there is provided the optical structure of aspect 18, wherein the retardation material forms a retardation layer located between the polarizing layer and the flexible glass substrate at the first side of the flexible glass substrate.

According to a twentieth aspect, there is provided the optical structure of aspect 19, wherein the touch layer is located at the second side of the flexible glass substrate.

According to a twenty-first aspect, there is provided the optical structure of aspect 18, wherein the retardation material forms a retardation layer, and the polarizing layer is located between the flexible glass substrate and the polarizing layer.

According to a twenty-second aspect, there is provided the optical structure of any one of aspects 15-21, wherein the polarizing layer is located at the first side of the ribbon of flexible glass substrate and the touch layer is located at the second side of the flexible glass substrate.

According to a twenty-third aspect, there is provided the optical structure of any one of aspects 15-19, wherein both the polarizing layer and the touch layer are located at the first side of the flexible glass substrate.

According to a twenty-fourth aspect, there is provided the optical structure of aspect 23, wherein the touch layer is located between the flexible glass substrate and the polarizing layer.

According to a twenty-fifth aspect, there is provided the optical structure of aspect 24, further comprising a retardation layer at the first side of the flexible glass substrate, wherein the touch layer and the polarizing layer are located between the retardation layer and the flexible glass substrate.

According to a twenty-sixth aspect, there is provided the optical structure of aspect 23, wherein the polarizing layer is located between the touch layer and the flexible glass substrate.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Embodiments described herein generally relate to optical structures that include both touch and polarizing components integrated on a flexible glass substrate, where at least the polarizing component is formed on the flexible glass substrate using a coating, as opposed to a preformed film material. The polarizing component may be, for example, a dichroic dye solution that exhibits a liquid crystal phase in the form of an aqueous solution. Use of a polarizing coating allows for continuous forming of the optical structures, for example, using a roll or other continuous feed of the flexible glass substrate in a relatively high velocity fashion.

Figure 1:
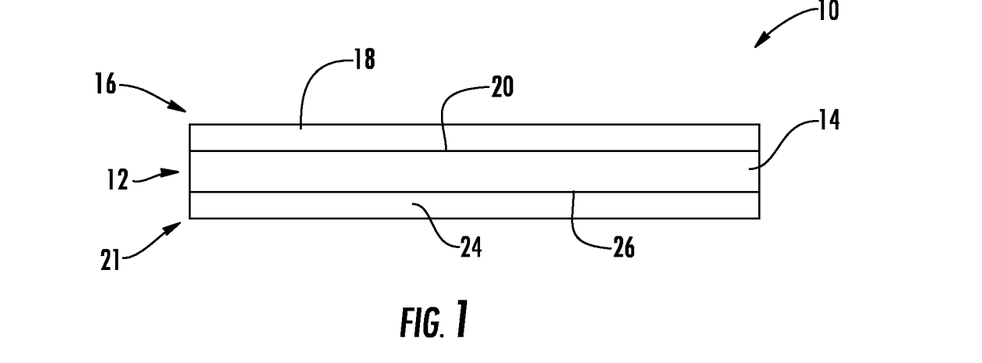
FIG. 1 illustrates an embodiment of an optical structure for use in forming a touch display in accordance with aspects of the disclosure.

Referring to FIG. 1, an optical structure 10 includes a glass layer 12 including a flexible glass substrate 14 with a polarizing layer 16 including a polarizing component 18 coated on one surface 20 of the flexible glass substrate 14 and a touch layer 21 including a touch component 24 applied to an opposite surface 26 of the flexible glass substrate 14. The flexible glass substrate 14 may be thin (e.g., less than about 0.3 mm), which can be advantageous over standard polymer substrates for higher processing temperatures, nearly zero birefringence (less than about ten nm in retardation) and neutral color.

The flexible glass substrate 14 may have a thickness of about 0.3 mm or less including but not limited to thicknesses of, for example, about 0.01-0.05 mm, about 0.05-0.1 mm, about 0.1-0.15 mm, about 0.15-0.3 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass substrate 14 may be formed of glass, a glass ceramic, a ceramic material or composites thereof. A fusion process (e.g., downdraw process) that forms high quality flexible glass sheets can be used in a variety of devices and one such application is flat panel displays. Glass sheets produced in a fusion process have surfaces with superior flatness and smoothness when compared to glass sheets produced by other methods. The fusion process is described in U.S. Pat. Ser. Nos. 3,338,696 and 3,682,609. Other suitable glass sheet forming methods include a float process, updraw and slot draw methods. Additionally, the flexible glass substrate 14 may also contain anti-microbial properties by using a chemical composition for the glass including an Ag ion concentration on the surface in the range greater than 0 to 0.047 µg/cm$^2$, further described in U.S. Patent Application Publication No. 2012/0034435 A1. The flexible glass substrate 14 may also be coated with a glaze composed of silver, or otherwise doped with silver ions, to gain the desired anti-microbial properties, further described in U.S. Patent Application Publication No. 2011/0081542 A1. Additionally, the flexible glass substrate 14 may have a molar composition of 50% $SiO_2$, 25% CaO, and 25% $Na_2O$ to achieve the desired anti-microbial effects.

The polarizing component 18 may be formed of any suitable material that is capable of being coated onto the surface 20 of the flexible glass substrate 14, either directly, or, for example, with an intermediate layer between the polarizing component 18 and the surface 20. For example, a dichroic dye-containing liquid may be used in forming the polarizing component 18. Dye molecule solutions in liquid crystal phase can be utilized to align the molecular direction, which can simplify polarizing component formation. Examples of dichroic dyes may be found in U.S. Pat. No. 6,049,428 and also include anthraquinone series, azo series, azomethine series, benzidine series, indigo series, merocyanine series, perylene series, quinone series, quinophthalone series, stilbene series, styryl series and tetrazine series. The dichroic dye-containing liquid, in addition to the dichroic dye, may contain additives, such as adhesion and/or toughness enhancers, rheology modifiers, plasticizers, surfactants, leveling agents, etc., depending, for example, on the desired optical properties of the display. Any suitable methods may be employed for coating the flexible glass substrate 14 with the dichroic dye-containing liquid, such as spin coating, flow coating, dip coating, slot die coating and spray coating.

The touch component 24 may be applied to the opposite surface 26 of the flexible glass substrate 14. However, other arrangements are possible, which will be described below. The touch component 24 may include a transparent conductor material, such as indium tin oxide (ITO) or any other suitably transparent conductive material. The touch pattern may be one that allows both X and Y position detection with one conductive plane. Electrodes may be provided using an etching process and/or stereo lithography, as an example, and provide capacitive-type touch screen capabilities. Any suitable methods may be used to apply the conductive material, such as vacuum sputtering or electron-beam evaporation or coating apparatuses.

Figure 2:
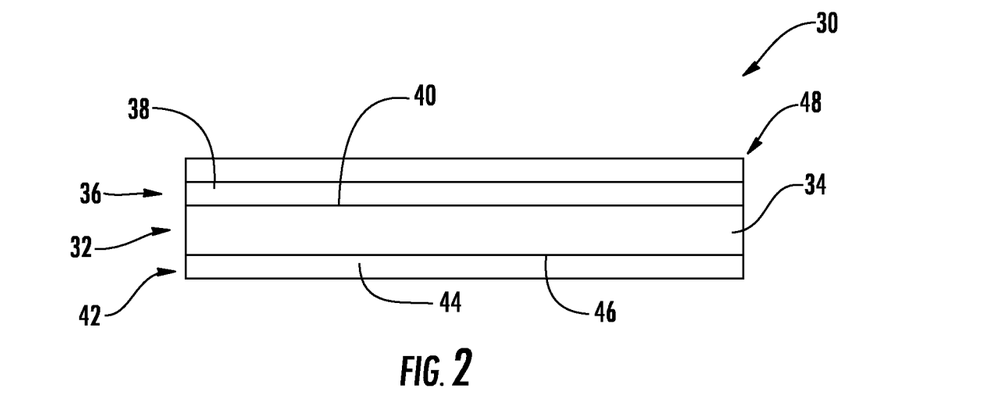
FIG. 2 illustrates another embodiment of an optical structure for use in forming a touch display in accordance with aspects of the disclosure.
Figure 3:
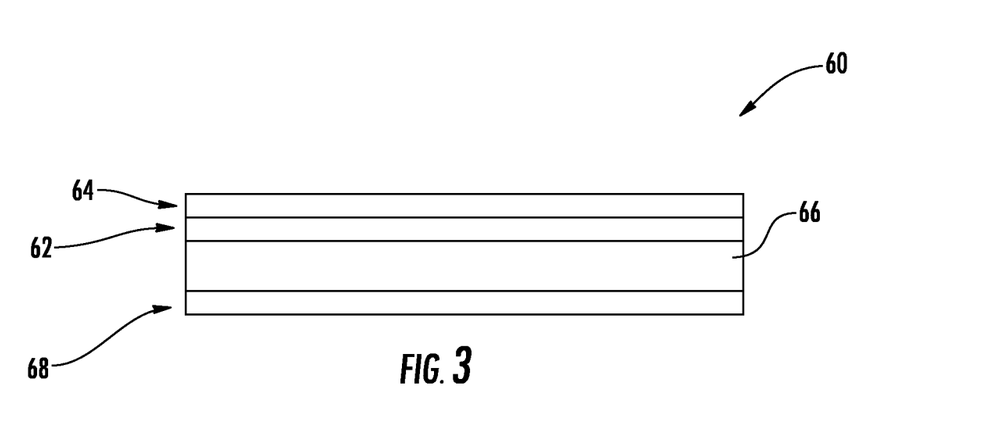
FIG. 3 depicts another embodiment of an optical structure for use in forming a touch display in accordance with aspects of the disclosure.

Referring to FIG. 2, another embodiment of an optical structure 30 includes many of the layers described above including a glass layer 32 including a flexible glass substrate 34 with a polarizing layer 36 including a polarizing component 38 coated on one surface 40 of the flexible glass substrate 34 and a touch layer 42 including a touch component 44 applied to an opposite surface 46 of the flexible glass substrate 34. In this exemplary embodiment, a retardation layer 48 (e.g., approximately ¼λ at 550 nm) is applied to a surface 50 of the polarizing layer 36. The retardation layer 48 may be used to alter the relative phase of the polarized light for added control over polarization. Exemplary materials for forming the retardation layer 48 include liquid crystal polymer and inorganic compounds. The retardation layer 48 may be applied by any suitable process, such as slot die coating, dip coating, curtain coating and vacuum deposition. FIG. 3 illustrates an alternative embodiment of an optical structure 60 where a retardation layer 62 is applied between a polarizing layer 64 and a flexible glass substrate 66 with a touch layer 68 applied on an opposite surface of the flexible glass substrate 66, as described above.

Figure 4:
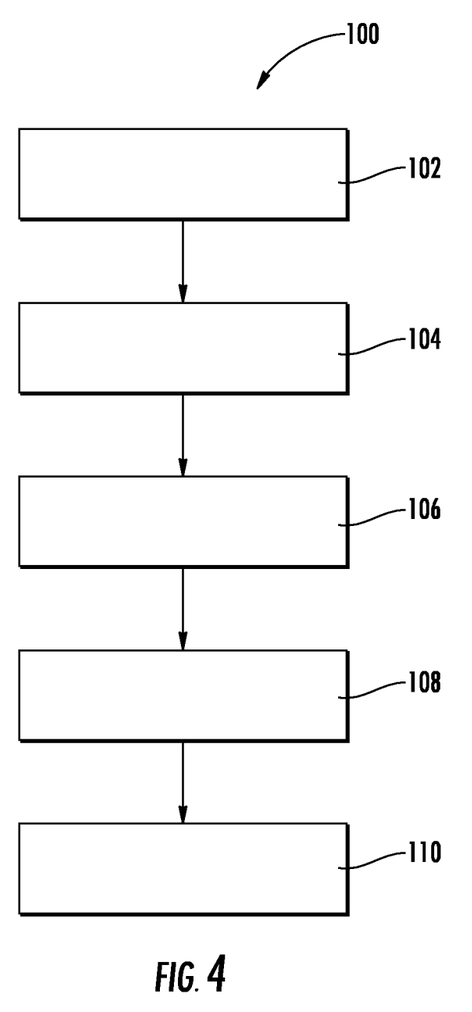
FIG. 4 depicts an exemplary method of forming an optical structure for use in forming a touch display in accordance with aspects of the disclosure.

Methods of manufacturing an optical structure for use in a touch display will now be described. FIG. 4 represents steps of example methods with the understanding that the illustrated steps may be carried out in a different order unless otherwise noted. Moreover, additional steps may be provided that are not illustrated unless otherwise stated. As shown in FIG. 4, the method can optionally begin at 100 with a step 102 of providing the flexible glass substrate having a thickness of about 300 µm or less, such as about 200 µm or less, such as about 100 µm or less, such as about 50 µm or less. The flexible glass substrate can be provided with glass selected from various families of glass including soda lime glass, borosilicate and alkaline earth boroaluminosilicate although other glass compositions may be used in further examples.

At step 104, a dichroic dye-containing liquid may be applied to a broad surface of a flexible glass substrate to form a polarization component. The dichroic dye-containing liquid may be applied on one side of the flexible glass substrate to form only one polarization component (FIG. 1). The thickness of the polarization layer may be, for example, between about 0.05 and 5 µm. In some embodiments, the dichroic dye-containing material may be applied on an orientation layer (e.g., a polyimide) for orienting and accumulating the dichroic dye. In other embodiments, an orientation layer may not be used. In some embodiments, the glass surface can be rubbed for orienting the dichroic dye and utilizing its dichroism, thereby forming the polarization layer at step 106. Any suitable abrasive may be used, such as foams containing abrasive grains. In some embodiments, a protective layer may be applied to the polarization layer. In other embodiments, a protective layer may not be used.

At step 108, a transparent conductive coating may be applied to an opposite broad surface (i.e., a surface opposite to that on which the polarization layer is disposed) of the flexible glass substrate. As indicated above, the transparent conductive coating may include ITO or silver nano-wire and may be applied, for example, a vacuum sputtering process or any other suitable process forming a transparent conductive coating for a touch component. At step 110, an electrode pattern may be formed in the transparent conductive coating using an etching process or other suitable process.

Figure 5:
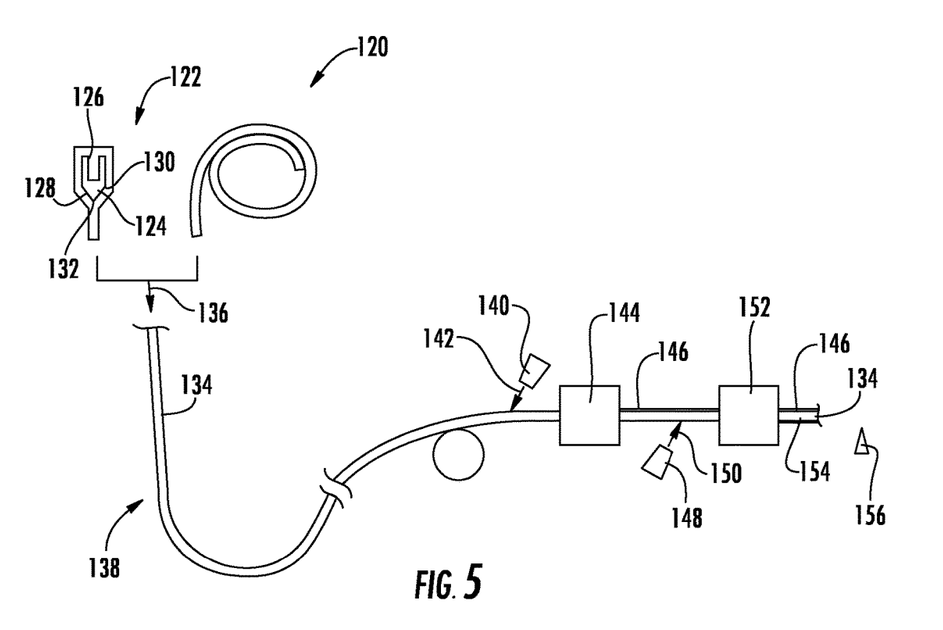
FIG. 5 illustrates schematically an embodiment of a process and apparatus for forming an optical structure for use in forming a touch display in accordance with aspects of the disclosure.

While the touch component need not be formed as a coating, use of coatings can facilitate formation of the optical structures during continuous processes, such as a roll or fabrication (e.g., down draw) processes. FIG. 5, for example, illustrates two example sources 120 of flexible glass substrate, although other sources may be provided. For instance, the source 120 can include a down draw glass forming apparatus 122. As schematically shown, the down draw glass forming apparatus 122 can include a forming wedge 124 at a bottom of a trough 126, wherein glass flows down opposite sides 128 and 130 of the forming wedge 124. The two sheets of molten glass are subsequently fused together as they are drawn off root 132 of the forming wedge 124. As such, the flexible glass substrate 134, in the form of a flexible glass ribbon, may be fusion drawn to traverse in a downward direction 136, off the root 132 of the forming wedge 124 and directly into a downward zone 138 positioned downstream of the down draw glass forming apparatus.

After forming, the flexible glass substrate 134 may be further processed, such as by cutting, trimming, etc. The flexible glass substrate 134, in the form of the continuous flexible glass ribbon, may be delivered or directed to a polarizer material application apparatus 140, such as a slot die coating device, flow coating device, dip coating device and/or spray coating device, where a polarizer material 142 (e.g., a dichroic dye-containing liquid) is applied to a broad surface of the flexible glass substrate 134 in a continuous or semi-continuous fashion. As indicated above, in some embodiments, the polarizer material 142 may be applied to the glass surface directly or to an orientation layer on the glass surface. The flexible glass substrate 134 with polarizer material 142 may be directed to a processing station 144 where the polarizer material 142 may be cured (by being heated and/or by being cooled) thereby forming a polarizing component 146. As indicated above, in some embodiments, a protective layer may be applied to the polarizing component 146. The flexible glass substrate 134 with polarizer component 146 may be directed to a conductive material application apparatus 148, such as a vacuum sputtering apparatus or coating device, where a conductive material 150 (e.g., such as a transparent conductive coating including ITO) is applied to an opposite broad surface of the flexible glass substrate 134 in a continuous or semi-continuous fashion. The flexible glass substrate 134 with polarizer material 142 and conductive material 150 may be directed to a processing station 152 where the conductive material 150 may be any of heated, cooled and patterned thereby forming a touch component 154. In some embodiments, the flexible glass substrate 134 may be directed to the conductive material application apparatus 148 first, and then to the polarizer material application apparatus 140 (for example, to form the optical structures of FIGS. 5 and 7). Additionally, while the conductive material apparatus 148 and the polarizer apparatus 140 are illustrated at opposite sides of the flexible glass substrate 134, they may be located at the same side to apply layers at the same side of the flexible glass substrate 134, both sides and/or there may be multiple apparatus for applying the various layers. In embodiments where is retardation layer is applied, the retardation layer may be applied as a coating or as a film material. A cutting device 156 may be used to separate individual optical devices from the continuous ribbon.

Figure 6:
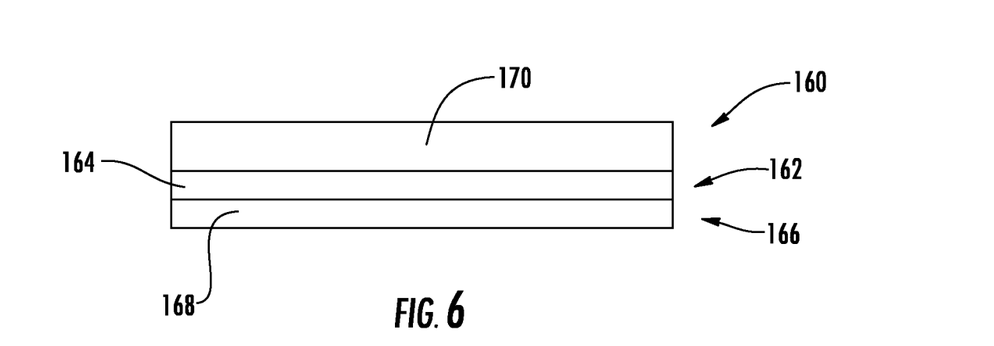
FIG. 6 illustrates another embodiment of an optical structure for use in forming a touch display in accordance with aspects of the disclosure.
Figure 7:
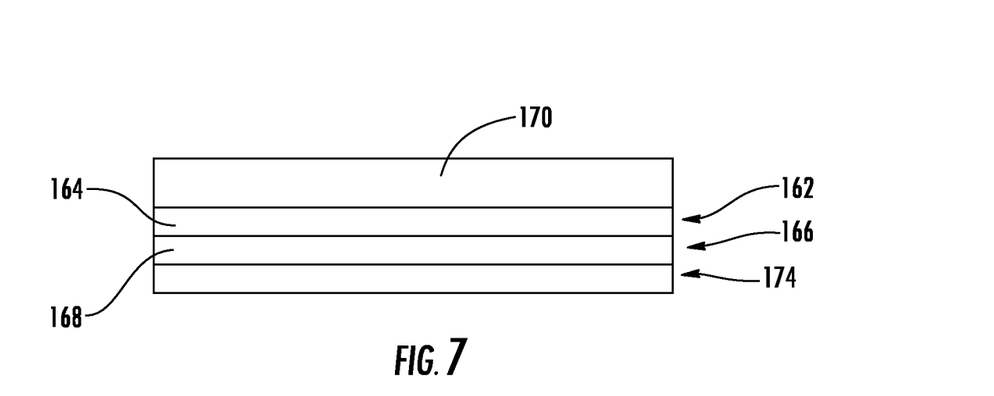
FIG. 7 illustrates another embodiment of an optical structure for use in forming a touch display in accordance with aspects of the disclosure.
Figure 8:
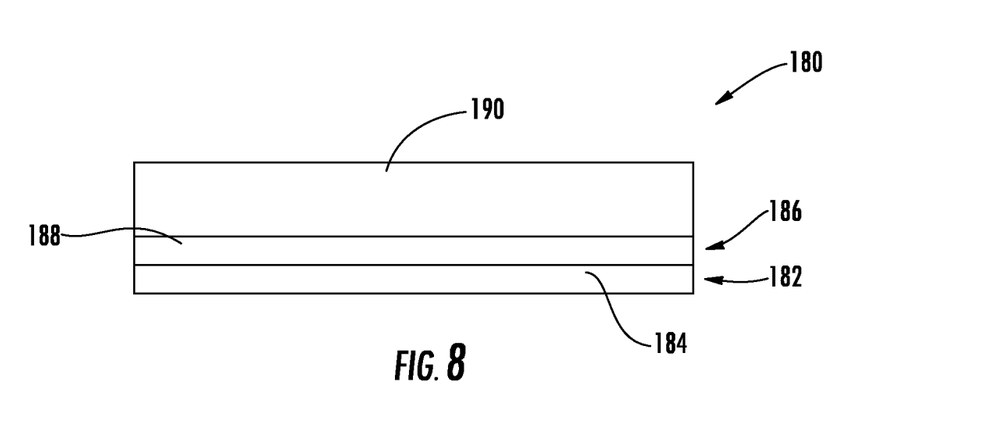
FIG. 8 illustrates another embodiment of an optical structure for use in forming a touch display in accordance with aspects of the disclosure.

FIGS. 1-3 illustrate optical structures including the polarizing component and the touch component on opposite sides of a flexible glass substrate. However, other arrangements are possible. Referring to FIG. 6, another embodiment of an optical structure 160 includes both a touch layer 162 including a touch component 164 and a polarizing layer 166 including a polarizing component 168 on the same side of a flexible glass substrate 170. In this embodiment, the touch component 164 is located between the flexible glass substrate 170 and the polarizing component 168. In some embodiments, a retardation layer 174 may be applied to the polarizing layer 166, as shown by FIG. 7. In FIG. 8 an embodiment of an optical structure 180 includes both a touch layer 182 including a touch component 184 and a polarizing layer 186 including a polarizing component 188 on the same side of a flexible glass substrate 190. In this embodiment, the polarizing component 188 is located between the flexible glass substrate 190 and the touch component 184. In the embodiments of FIGS. 6-8, the flexible glass substrates may provide a protective barrier for the polarizing and touch components.

The above-described optical structures can integrate both the polarization and touch components on a single flexible glass substrate due, at least in part, to the flexible glass substrate having essentially zero birefringence, excellent optical clarity, chemical stability and high temperature processing capabilities. Use of thin flexible glass substrates allows for continuous (e.g., roll-to-roll) processing using a polarizer coating material. Increased chemical stability of the flexible glass substrate enables wider selection of dichroic dye-liquid crystal systems. Essentially zero birefringence of the flexible glass substrate enables increased performance as a polarizing optical component.

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the present disclosure and protected by the following claims.

What is claimed is:

1. A method of forming an optical structure in a continuous manufacturing process, the method comprising:
   providing a continuous ribbon of flexible glass substrate having a thickness of no more than 0.3 mm, the continuous ribbon of flexible glass substrate having a first side and a second side separated by a plane formed by the ribbon of flexible glass substrate;

applying a liquid polarizer material on the ribbon of flexible glass substrate at one of the first and second sides as the continuous ribbon of flexible glass substrate moves by a polarizer material application apparatus to form a polarizing layer; and applying a conductive material on the ribbon of flexible glass substrate at one of the first and second sides to form a touch layer for a touch sensitive display.

2. The method of claim 1, wherein the liquid polarizer material comprises a dichroic dye-containing liquid.

3. The method of claim 1 further comprising orienting the liquid polarizing material to form a polarizing component.

4. The method of claim 1 further comprising applying a retardation material at one of the first and second sides.

5. The method of claim 4, wherein the retardation material forms a retardation layer located between the polarizing layer and the ribbon of flexible glass substrate at the first side of the ribbon of flexible glass substrate.

6. The method of claim 5, wherein the touch layer is located at the second side of the ribbon of flexible glass substrate.

7. The method of claim 4, wherein the retardation material forms a retardation layer, the polarizing layer located between the ribbon of flexible glass substrate and the polarizing layer.

8. The method of claim 1, wherein the polarizing layer is located at the first side of the ribbon of flexible glass substrate and the touch layer is located at the second side of the ribbon of flexible glass substrate.

9. The method of claim 1, wherein both the polarizing layer and the touch layer are located at the first side of the ribbon of flexible glass substrate.

10. The method of claim 9, wherein the touch layer is located between the ribbon of flexible glass substrate and the polarizing layer.

11. The method of claim 10, further comprising applying a retardation layer at the first side of the ribbon of flexible glass substrate, wherein the touch layer and the polarizing layer are located between the retardation layer and the ribbon of flexible glass substrate.

12. The method of claim 9, wherein the polarizing layer is located between the touch layer and the ribbon of flexible glass substrate.

13. A roll of an optical structure comprising:
a continuous ribbon of flexible glass substrate having a thickness of no more than 0.3 mm, the continuous ribbon of flexible glass substrate having a first side and a second side separated by a plane formed by the continuous ribbon of flexible glass substrate;
a coating of a polarizer material on the continuous ribbon of flexible glass substrate at one of the first and second sides forming a polarizing layer, the coating of polarizer material being formed of a dichroic dye-containing liquid; and
a conductive material on the continuous ribbon of flexible glass substrate at one of the first and second sides to form a touch layer for a touch sensitive display.

14. The optical structure of claim 13 further comprising a retardation material at one of the first and second sides.

15. The optical structure of claim 14, wherein the retardation material forms a retardation layer located between the polarizing layer and the continuous ribbon of flexible glass substrate at the first side of the continuous ribbon of flexible glass substrate.

* * * * *